(12) United States Patent
Canale et al.

(10) Patent No.: US 7,497,199 B2
(45) Date of Patent: Mar. 3, 2009

(54) CLOSED-LOOP ELECTRONIC CONTROL SYSTEM FOR CONTROLLING COMBUSTION IN A DIESEL ENGINE OPERATING WITH HIGHLY PREMIXED COMBUSTION

(75) Inventors: Silvio Canale, Strada (IT); Michele Pelassa, Strada (IT)

(73) Assignee: C.R.F. Societa Consortile per Azioni, Strada Torini (IT)

( * ) Notice: Subject to any disclaimer, the term of this patent is extended or adjusted under 35 U.S.C. 154(b) by 257 days.

(21) Appl. No.: 11/106,463

(22) Filed: Apr. 15, 2005

(65) Prior Publication Data

US 2005/0274352 A1 Dec. 15, 2005

(30) Foreign Application Priority Data

Jun. 15, 2004 (EP) .................................. 04425444

(51) Int. Cl.
*F02B 3/00* (2006.01)
(52) U.S. Cl. ......................................... 123/299; 123/435
(58) Field of Classification Search ................. 123/299, 123/300, 435, 501
See application file for complete search history.

(56) References Cited

U.S. PATENT DOCUMENTS

| | | | | |
|---|---|---|---|---|
| 4,704,999 A | * | 11/1987 | Hashikawa et al. | 123/299 |
| 4,739,731 A | * | 4/1988 | Habich et al. | 123/501 |
| 4,796,577 A | * | 1/1989 | Baranescu | 123/300 |
| 5,119,780 A | * | 6/1992 | Ariga | 123/300 |
| 5,875,743 A | | 3/1999 | Dickey | |
| 6,142,119 A | | 11/2000 | Abe et al. | |
| 6,276,334 B1 | | 8/2001 | Akinyemi et al. | |
| 6,637,404 B2 | | 10/2003 | Fuerhapter et al. | |
| 6,659,072 B2 | * | 12/2003 | Heinzelmann | 123/299 |
| 6,684,852 B2 | * | 2/2004 | Wright et al. | 123/431 |
| 6,688,279 B2 | * | 2/2004 | Ishikawa et al. | 123/299 |
| 6,705,277 B1 | * | 3/2004 | McGee | 123/299 |
| 6,840,211 B2 | * | 1/2005 | Takahashi | 123/299 |

(Continued)

FOREIGN PATENT DOCUMENTS

DE 10221001 11/2003

(Continued)

OTHER PUBLICATIONS

Bosch Automotive Handbook—4th Edition, Oct. 1996—p. 36B.

*Primary Examiner*—Stephen K Cronin
*Assistant Examiner*—Arnold Castro
(74) *Attorney, Agent, or Firm*—Crowell & Moring LLP

(57) ABSTRACT

Described herein is a closed-loop electronic control system for controlling combustion in a diesel engine operating with highly premixed combustion, in which an injection system is designed to obtain at least two injections of fuel per engine cycle, the injections comprising at least one pilot injection and a subsequent main injection. The system is provided with sensors designed for measuring or calculating quantities characteristic of the process of fuel combustion, and a closed-loop control block, which provides a control of the modality of fuel injection based upon the measured or calculated value of the quantities by regulating at least one of the following parameters: the distance in time elapsing between the execution of the pilot injection and the main injection; and the amount of fuel injected by means of the pilot injection.

15 Claims, 6 Drawing Sheets

U.S. PATENT DOCUMENTS

| | | |
|---|---|---|
| 6,912,992 B2 * | 7/2005 | Ancimer et al. ............. 123/299 |
| 6,966,040 B2 * | 11/2005 | Ismailov ........................ 716/1 |
| 6,994,077 B2 * | 2/2006 | Kobayashi et al. ..... 123/568.11 |
| 7,000,596 B2 * | 2/2006 | Zurloye et al. .............. 123/435 |
| 2002/0007816 A1 | 1/2002 | Zur Loye et al. |
| 2002/0011240 A1 | 1/2002 | Kimura |
| 2002/0040692 A1 | 4/2002 | LaPointe et al. |
| 2002/0078918 A1 | 6/2002 | Ancimer et al. |
| 2003/0150420 A1 * | 8/2003 | Ishikawa et al. ............ 123/300 |
| 2003/0230276 A1 | 12/2003 | Kataoka et al. |
| 2003/0233997 A1 * | 12/2003 | Kawaguchi et al. ......... 123/299 |
| 2004/0154582 A1 * | 8/2004 | Shimazaki ................. 123/299 |

FOREIGN PATENT DOCUMENTS

| | | |
|---|---|---|
| EP | 0921296 | 5/2004 |
| EP | 1 424 481 A | 6/2004 |
| EP | 0997624 | 2/2005 |
| WO | WO 98/07973 | 2/1998 |
| WO | WO 03/095818 | 11/2003 |

* cited by examiner

CLOSED-LOOP ELECTRONIC CONTROL SYSTEM FOR CONTROLLING COMBUSTION IN A DIESEL ENGINE OPERATING WITH HIGHLY PREMIXED COMBUSTION

BACKGROUND AND SUMMUARY OF THE INVENTION

The present invention relates to a closed-loop electronic control system for controlling combustion in a diesel engine operating with highly premixed combustion.

As is known, in the execution of the thermal cycle of a diesel engine reactions of oxidation of the fuel take place, in which the conditions of ignitibility of the fuel mainly depend upon the temperature, the pressure and the concentration of oxygen in the combustion chamber. Combustion is regulated by acting on the law of injection (amount of fuel injected per unit time), regulating the ignition delay and the amount of fuel that is accumulated in the chamber prior to the start of combustion.

In particular, in the process of combustion it is possible to highlight two distinct steps, namely:

a first step referred to as premixing step, in which the fuel accumulated prior to ignition is burnt; and a second step referred to as diffusion step, in which the fuel injected subsequent to the start of combustion is burnt.

In the first, premixing, step the fuel is self-ignited after having had time for mixing with the gas present in the combustion chamber.

The quality of said mixing depends upon the ignition delay, upon the form of motion of the gas in the chamber (turbulence, swirling motion, etc.) and upon the characteristics of the spray of fuel.

The mixing times are in any case much shorter than the ignition delay in the cases of common application, and therefore substantially all the fuel injected prior to the start of combustion is premixed.

The high degree of premixing enables the fuel to use the oxygen present in the chamber as well as possible, guaranteeing complete combustion without any emission of smoke. The step of premixed combustion is, however, responsible for combustion noise.

The diffusion step is instead characterized in that the fuel is injected into the chamber after combustion has started and hence in the presence of very high temperatures and pressures. In said conditions, the ignition delays are minimal, and the fuel is able to burn albeit in the presence of very low amounts of oxygen. It occurs, however, that part of the fuel, on account of the low degree of mixing, will not succeed in initiating or completing the reactions of combustion owing to the lack of oxygen with which to react, but at the same time will be heated considerably by the heat produced by the combustion in the chamber, leading to the formation of solid particles in the form of soot. The low degree of mixing is at the same time responsible for a greater production of nitrogen oxides ($NO_x$) in so far as it leads to the formation of areas in the chamber more involved in the combustion, which remain at high temperatures for a long time (the so-called hot points), in which the $NO_x$ are more easily formed. The diffusion step is then responsible for the formation of the majority of the emissions of smoke and nitrogen oxides. At the same time, it is, however, characterized by a progressive release of energy, regulated by the law of injection of fuel, which generates low pressure gradients in the chamber and hence low combustion noise.

It is moreover known practice, for the purpose of regulating the noise and the emissions, to carry out a first injection, referred to as pilot injection, and at least one subsequent injection, referred to as main injection.

In particular, the pilot injection concurs in dividing combustion between a premixing step and a diffusion step. In fact, as the amount of fuel injected via the pilot injection increases, the ignition delay is reduced, and the amount of accumulated fuel to be burnt in the premixing step is reduced at the same time, thus leading to a lower combustion noise but an increase in pollutant emissions.

Conventional combustion is characterized by a compromise between emissions and combustion noise, which, once it has been defined in the design stage, must be as repeatable and reliable as possible, cylinder by cylinder, throughout the life of the engine.

For example, the patent applications EP-921.296 and DE-102.21.001 propose solutions in which the amount of fuel supplied using the pilot injection is adjusted in order to control the combustion noise and the instant of ignition. The patent EP-921.296 proposes the use of a noise sensor; and the patent DE-102.21.001 proposes the use of an ionization-current sensor, which is able to detect the start of combustion.

Furthermore, in order to reduce the emissions of $NO_x$ use is commonly made of the recirculation of burnt gases in the combustion chamber. This is known as exhaust-gas recirculation (EGR). According to this practice, there is introduced into the chamber a gas, the carbon dioxide present in the products of combustion, which is characterized in that it has a greater thermal capacity and hence is able to reduce the temperatures in the combustion chamber given the same heat developed by combustion, and is able to reduce the heat exchange between the hot areas of the chamber, with the overall effect of reducing the nitrogen oxides as a whole produced by combustion. Said amount of recirculated burnt gases reduces, however, the amount of oxygen in the chamber and hence, given the same degree of mixing of the gases, causes an increase in the emissions of smoke. The total amount of recirculated exhaust gases is usually controlled by means of a closed-loop control using an air-flow sensor.

As an alternative to the conventional diesel combustion outlined above, of considerable interest in the field of diesel engines is premixed-charge compression ignition (PCCI), which derives from the idea of premixing, either completely or to a very high extent, fuel and gas prior to the start of combustion, this tending towards the combustion of a homogeneous mixture and eliminating the disadvantages of diffusive combustion.

PCCI combustion is however possible only if the ignition delays are greater than the duration of the injection event and can be used only if it is possible to control the energy release of the premixed mass of fuel at the moment of ignition, in order to prevent damage to the engine and to control combustion noise.

In the case where it is possible to obtain combustion of a totally premixed mixture low emissions of smoke and $NO_x$ are obtained.

A series of studies has demonstrated the great difficulty involved in using PCCI combustion in all the ranges of use of the engine, when this is oriented towards an automotive use. This behaviour is highlighted in FIG. 1, which illustrates the operating map of a conventional diesel engine (solid line) and the operating map of a diesel engine running with PCCI combustion (dashed line) in the engine diagram defined by the engine r.p.m. (RPM) and the brake mean effective pressure (BMEP).

The behaviour highlighted above, i.e., the impossibility of using the plane of operation of the engine completely, has led to the development of strategies (for example the ones described in WO 98/07973, U.S. Pat. No. 5,875,743, and EP-0997.624), in which the use of PCCI combustion is confined to certain given regimes and operating loads of the engine.

PCCI combustion is moreover characterized by a degree of instability due to the fact that, since long ignition delays are generated in order to obtain a high degree of premixing, start of combustion is uncoupled from phasing of injection, thus rendering problematical direct control of the start of combustion and of the engine angular position.

At the same time, in order to reduce energy release at the moment of ignition, for the purpose of preventing damage to the engine and excessive combustion noise, in the majority of applications recourse is had to a large amount of recirculated burnt gases, which may even reach 70% of the total mass of gas in the combustion chamber. In such conditions combustion risks degenerating into a misfire, at a minimal variation of the control parameters, the most important being the mass of recirculated exhaust gases, thus contributing to an increase in the potential instability in combustion.

Direct control of combustion applied to PCCI combustion hence becomes an indispensable tool for the very operation of the engine. Examples of documents that propose a direct control of combustion are the U.S. patent applications US20020007816, U.S. Pat. Nos. 6,637,404, 6,142,119, US20030230276, and US20020011240.

The purpose of the present invention is to provide an efficient and simple control strategy for PCCI combustion.

The above purpose is achieved by the present invention in so far as it relates to a closed-loop electronic control system for controlling combustion in a diesel engine operating with highly premixed combustion, in which an injection system is designed to obtain at least two fuel injections in one cylinder per engine cycle, said injections comprising at least one pilot injection and a subsequent main injection, said system being characterized in that it comprises:

sensor means designed for measuring or calculating quantities characteristic of the process of fuel combustion; and closed-loop control means, which carry out a control of the modality of fuel injection based upon the measured or calculated value of said quantities and upon reference values by regulating at least one of the following parameters:

a) the distance in time between the pilot injection and the main injection; and b) the amount of fuel injected by means of the pilot injection.

BRIEF DESCRIPTION OF THE DRAWINGS

The invention will now be illustrated with particular reference to the attached figures, which represent a preferred non-limiting embodiment thereof, and in which.

DETAILED DESCRIPTION OF THE DRAWINGS

Figure 1:
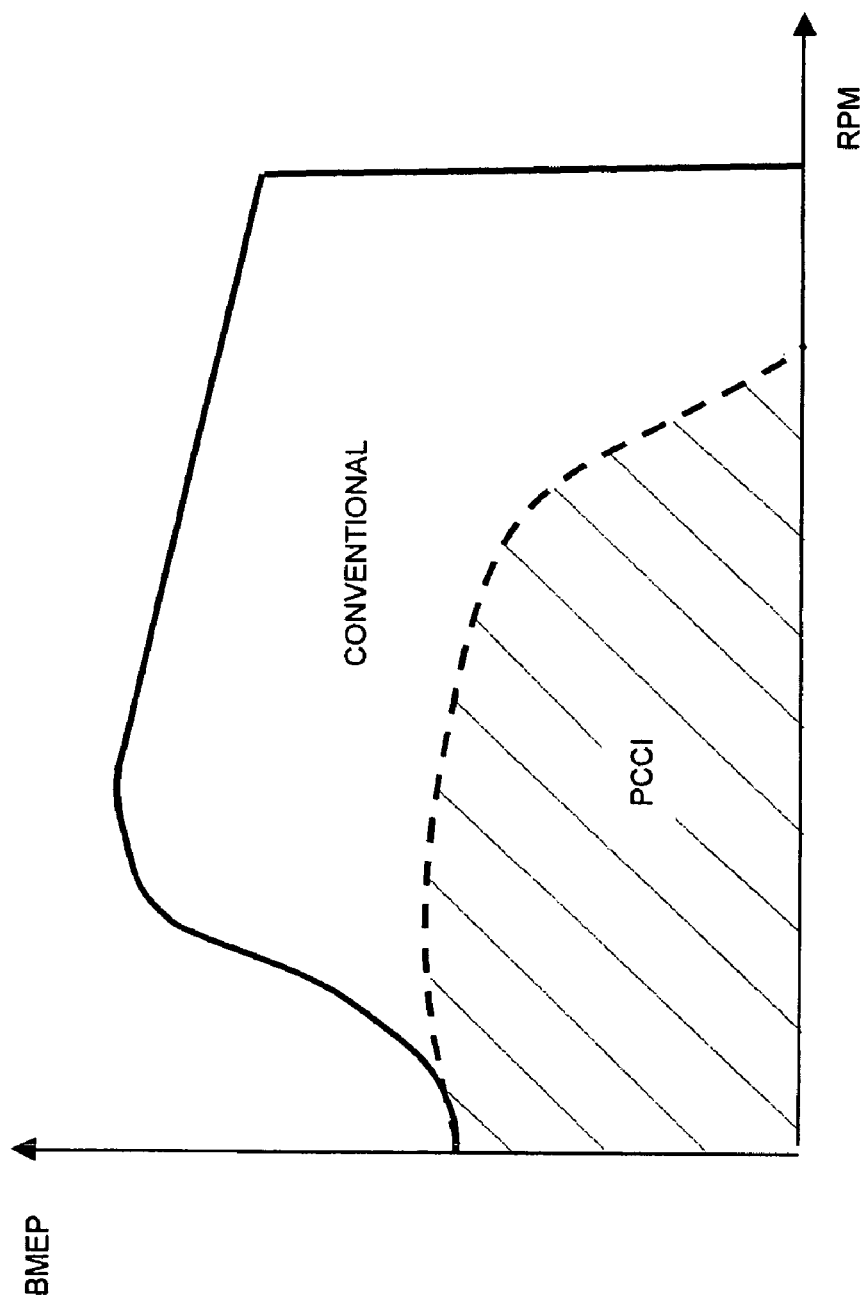
FIG. 1 shows the conventional combustion and the PCCI combustion in the engine plane.
Figure 2:
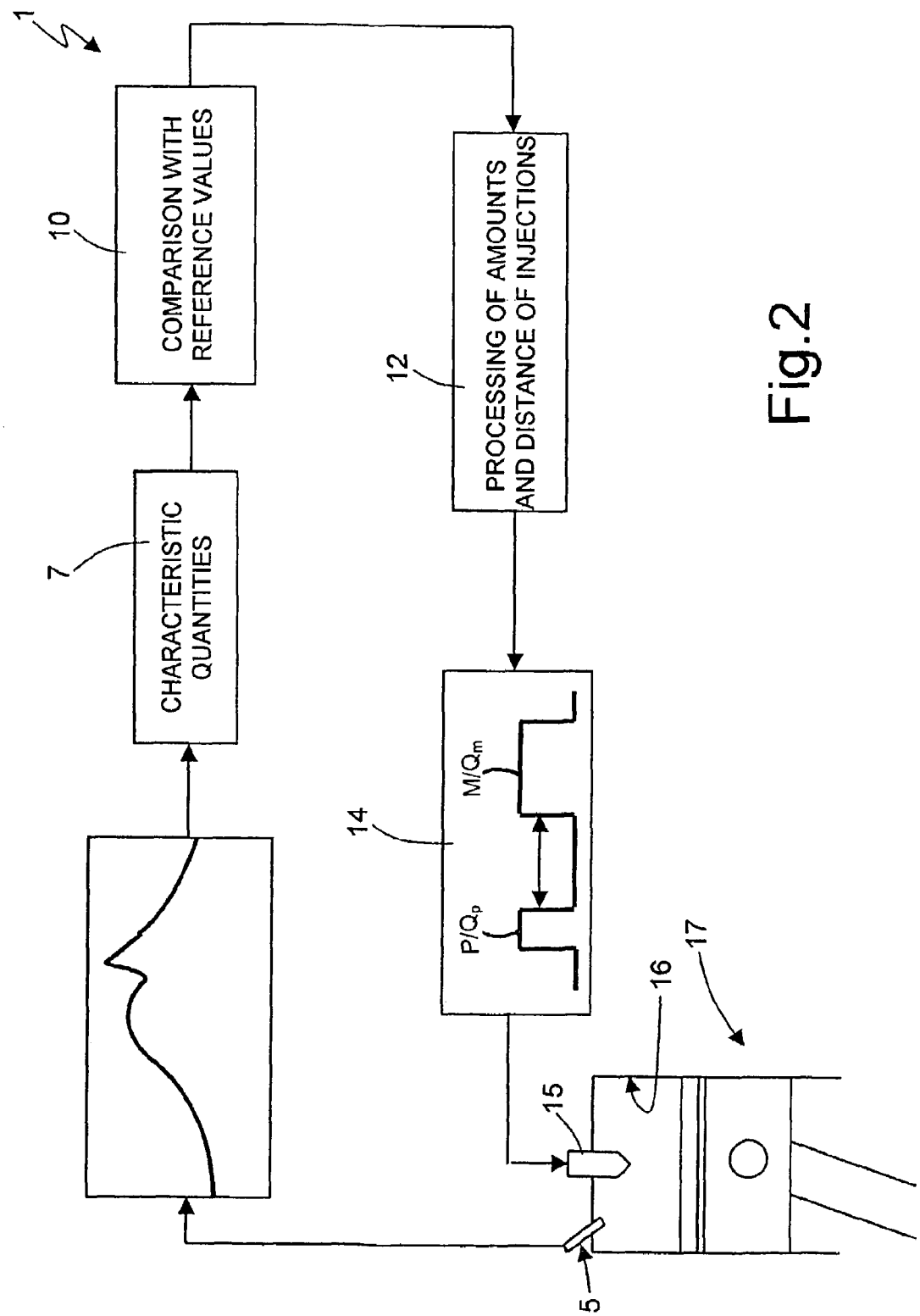
FIG. 2 is a schematic illustration of a closed-loop electronic control system for controlling combustion in a diesel engine operating with highly premixed combustion built according to the teachings of the present invention.

Designated, as a whole, by 1 in FIG. 2 is a closed-loop electronic control system for controlling combustion in a diesel engine operating with highly premixed combustion.

In particular, the system 1 comprises a plurality of sensors 5 (of a known type) which are designed for measuring and/or calculating some quantities characteristic of the process of fuel combustion, for example the instant of start of combustion, the centroid of the process of combustion, the maximum derivative of the pressure cycle, the noise emitted during the combustion cycle, etc. The sensors 5 may be physical sensors designed for measuring directly said quantities or else virtual sensors designed for extrapolating the quantities by means of mathematical calculations based upon different input data. For example, in the absence of a specific sensor of combustion noise, said quantity can be measured starting from the pressure signal indicating the pressure inside the cylinder, calculating its derivative as a function of the engine angle and exploiting the direct proportionality that exists between combustion noise and maximum derivative of the pressure cycle.

The sensors 5 produce output signals which, after being treated by a processing block 7, are compared with reference values in a comparison block 10, which generates error signals that are supplied at input to a control block 12, which then performs a closed-loop control, based upon the input error signals, of the modalities of fuel injection.

In particular, the block 12 acts on an injection system 14 that controls injectors 15 used for fuel supply to the combustion chambers 16 of a diesel engine 17 (illustrated schematically). The injection system 14 is preferably of the common-rail type and is able to inject into the combustion chamber 16 of each cylinder two or more injections of fuel per engine cycle.

Figure 3:
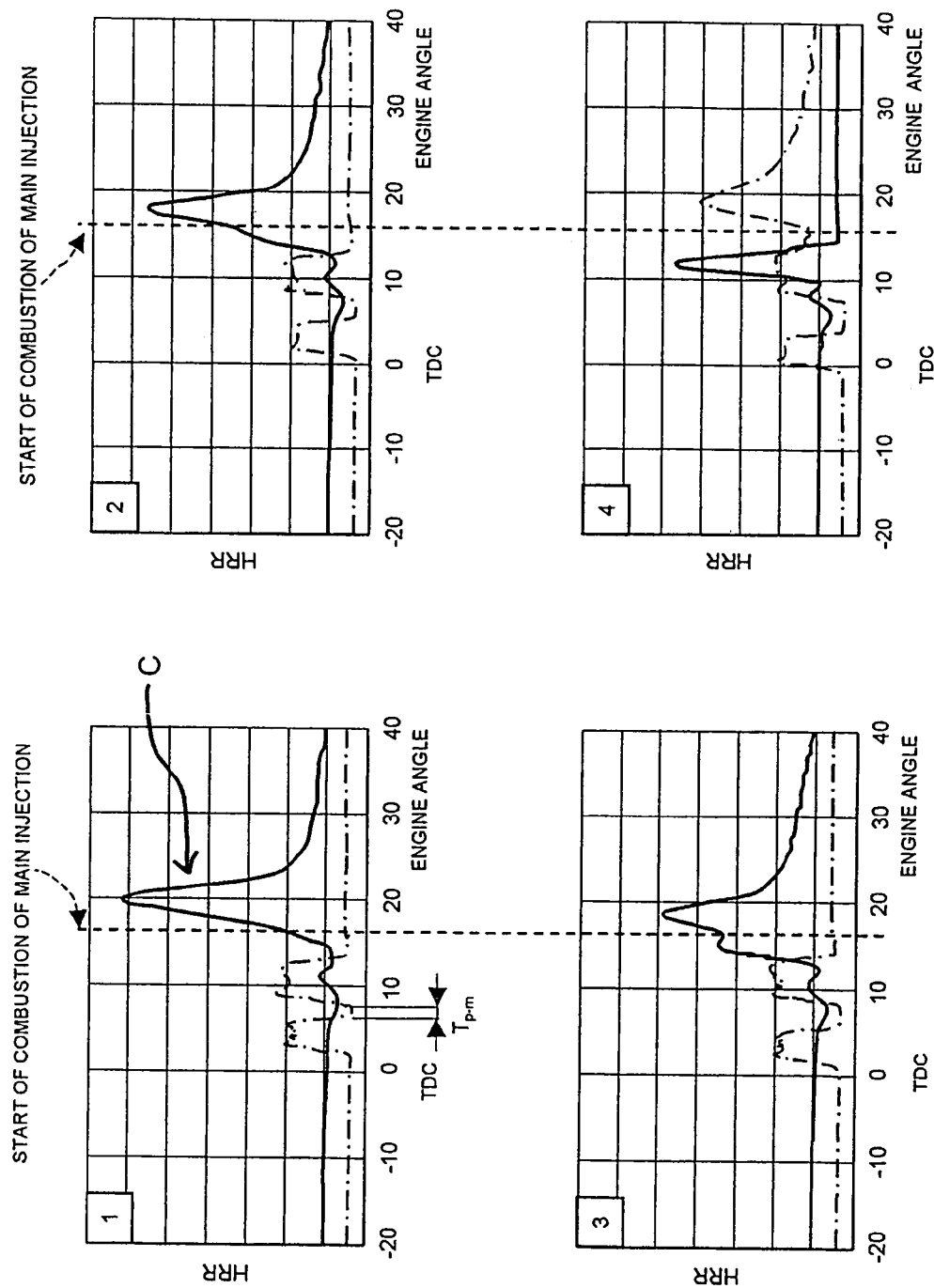
FIGS. 3, 4a, 4b, 4c, 5, 6a, 6b and 6c illustrate quantities controlled by the system according to the present invention.

In particular, the injection system 14 is designed to obtain at least one first injection or pilot injection P, with which there is supplied a reduced amount of fuel $Q_p$, followed in time by a second injection or main injection M, with which a larger amount of fuel $Q_m$ is supplied (See FIGS. 2 and 3).

Once the quantities have been measured by means of the sensors 5, the control system, at each engine cycle and for each cylinder, acts so as to cause the quantities measured to converge to the respective reference values.

In particular, according to the closed-loop control exerted according to the present invention at least one of the following parameters is regulated:

a) the distance in time $T_{p-m}$ between the pilot injection P and the main injection M;

b) the amount of fuel $Q_p$ injected by means of the pilot injection P.

The amount of fuel $Q_p$ injected by means of the pilot injection P can, for example, be regulated by carrying out a pre-set number of successive cycles of opening of the injector. It is clear how the amount of fuel $Q_p$ injected increases as the number of cycles of opening of the injector increases.

Should a control according to point a) be implemented, the position in time of the main injection M is maintained constant, and the position in time of the pilot injection P is displaced.

Should a control according to point b) be implemented, which entails the variation in the amount of fuel $Q_p$ supplied with the pilot injection P, the amount of fuel $Q_m$ supplied with the main injection M is varied accordingly for the purpose of maintaining the amount of fuel ($Q_p+Q_m$) totally injected by means of the two subsequent injections P, M constant. For example, as the amount of fuel $Q_p$ injected with the pilot injection P increases, the amount of fuel Qm injected with the main injection M decreases, and vice versa.

According to the experimental data obtained by the present applicant it has been possible to note that, following upon modification of the distance in time Tp-m between the pilot injection P and the main injection M (FIG. 3) or of the amount of fuel Qp injected with the pilot injection P (FIG. 5), the form of the energy release varies.

In particular, when the pilot injection P and the main injection M are extremely close to one another, for example set apart by an interval of 100 μs (FIG. 3, graph 1), it is not possible to distinguish the release of heat (curve C) of the two injections, and the release of energy is altogether similar to that of a single injection.

By delaying progressively the pilot injection P with respect to the main injection M, for example should the two injections be set apart by an interval of 400 μs, i.e., as the distance Tp-m (FIG. 3, graphs 2-3-4) increases, it is instead possible to distinguish two distinct combustions, obtaining as global effect a different form of combustion (see graphs C).

There is thus a passage from a condition equivalent to a single combustion (FIG. 3, graph 1) to a condition in which two distinct premixed combustions are observed (FIG. 3, graphs 3 and 4).

Figure 4B:
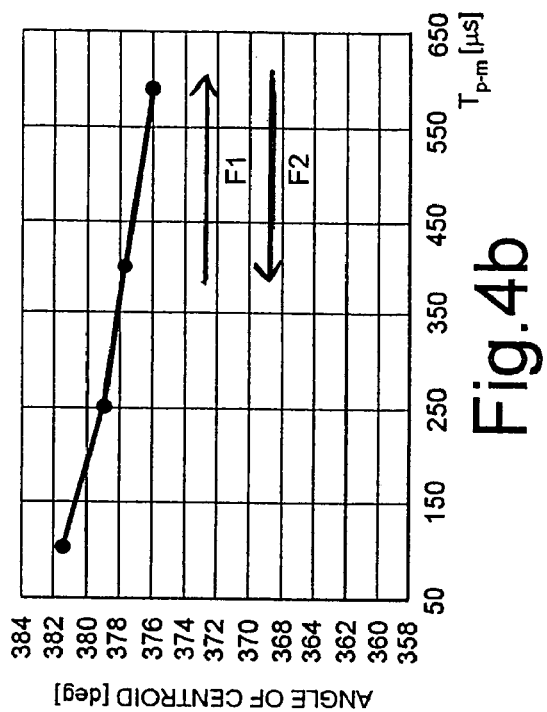
Figure 4A:
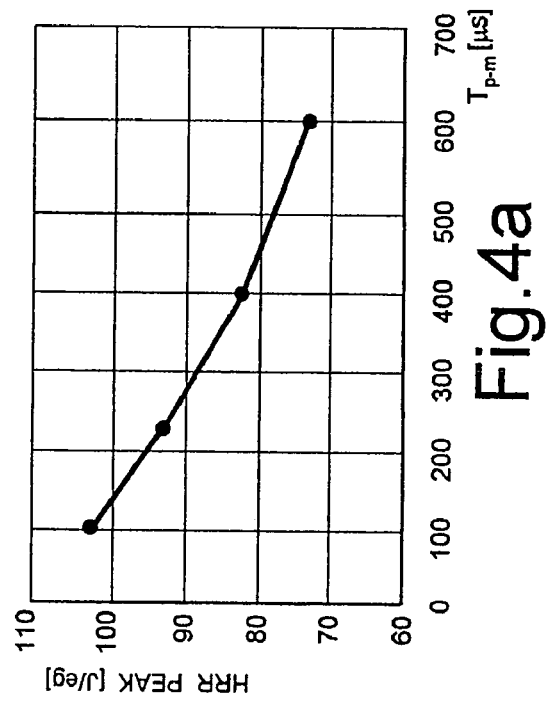

FIG. 4a shows the plot of the peak value of the heat release or heat-release rate (HRR), i.e., the maximum peak of curve C, as a function of the distance Tp-m; as may be noted, as the distance Tp-m increases, there is a monotonic reduction in the peak value of the HRR.

FIG. 4b shows the trend of the angular position of the centroid of combustion as a function of the distance Tp-m; as may be noted, as the distance Tp-m increases, the centroid of combustion shifts in time towards smaller time values with respect to a reference value consisting of the top dead centre TDC (the position of the TDC may be identified along the axis Y). Likewise, as the distance Tp-m is reduced, the centroid of combustion shifts in time towards higher time values with respect to a reference value consisting of the TDC.

Figure 4C:
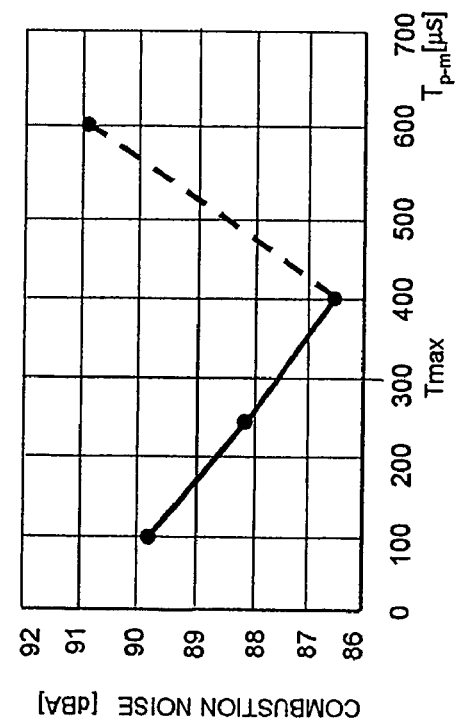

The reduction in the heat-release peak (FIG. 4a) entails a reduction in the pressure gradient and consequently produces a reduction in the combustion noise (FIG. 4c), which decreases as Tp-m increases, until a minimum is reached, after which the noise starts to increase again. In fact, once a certain limit distance has been exceeded, a further increase in the distance between the injections concurs to increasing the combustion noise since the source of noise becomes the pilot combustion.

Consequently, the distance Tp-m is not increased by the system according to the present invention above a certain limit Tmax, beyond which the noise increases again (dashed part of curve).

Should the system reach the limit value Tmax and at the same time a further anticipation of the centroid of combustion be required, an increase in the distance Tp-m is no longer possible in so far as this would entail an increase in noise. In this case, the system shifts in time both the pilot injection P and the main injection M with respect to a reference (TDC). The further displacement of the centroid is thus obtained without any increase in combustion noise.

In this case, the pilot injection P must anyway supply a large amount of fuel in such a way that the variation of the distance in time Tp-m is able to modify markedly the centroid of combustion.

The system can therefore increase the distance in time Tp-m for the purpose of anticipating the centroid of combustion (FIG. 4b, arrow F1).

Likewise, when it is desired to delay the centroid of combustion, the control proceeds by bringing the pilot injection P closer to the main injection M (FIG. 4b, arrow F2). Said approach can be carried out up to a limit value, which is a parameter characteristic of the injection system, beyond which any further approach is no longer possible. In this case, once again, the system shifts in time both the pilot injection P and the main injection M with respect to a reference (TDC), in the direction consistent with the required displacement of centroid.

Figure 5:
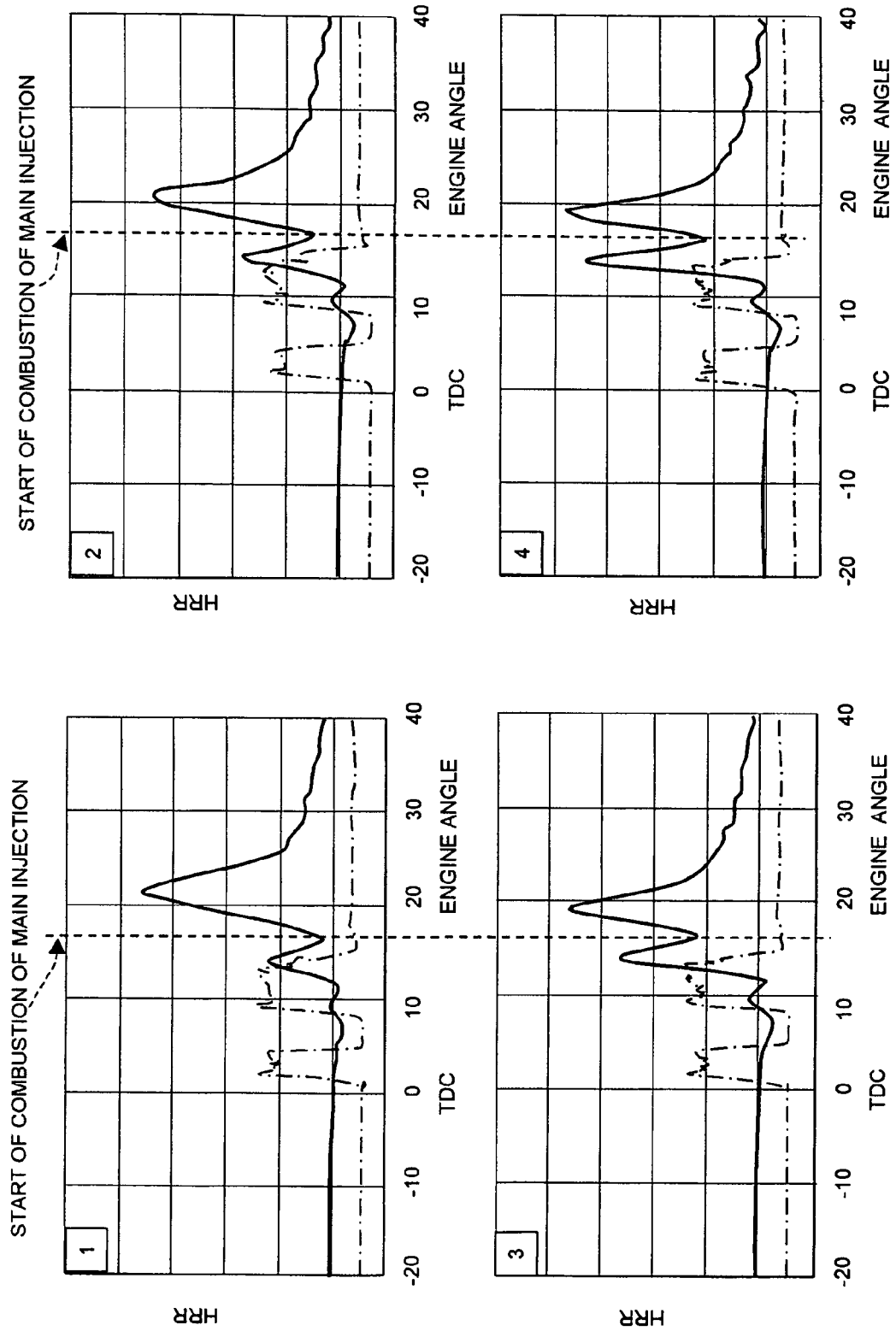
Figure 6A:
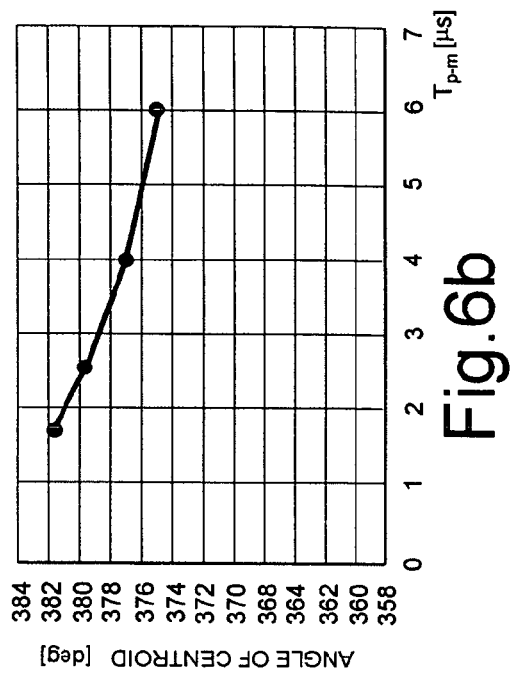
Figure 6B:
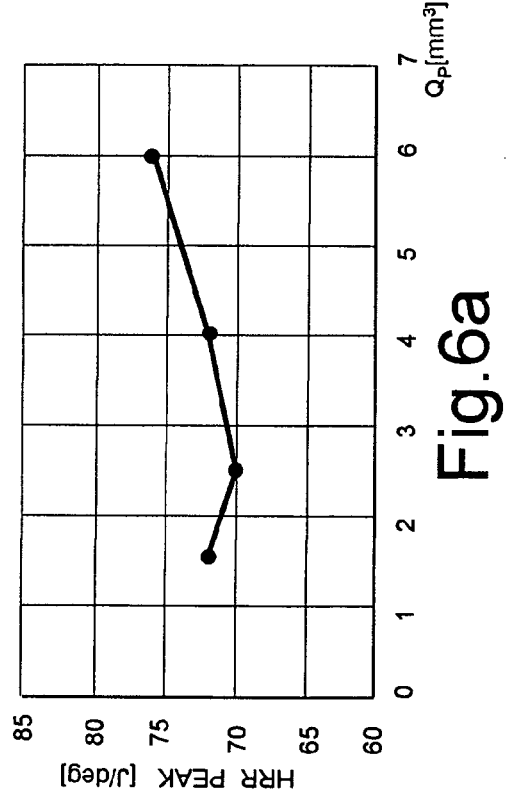
Figure 6C:
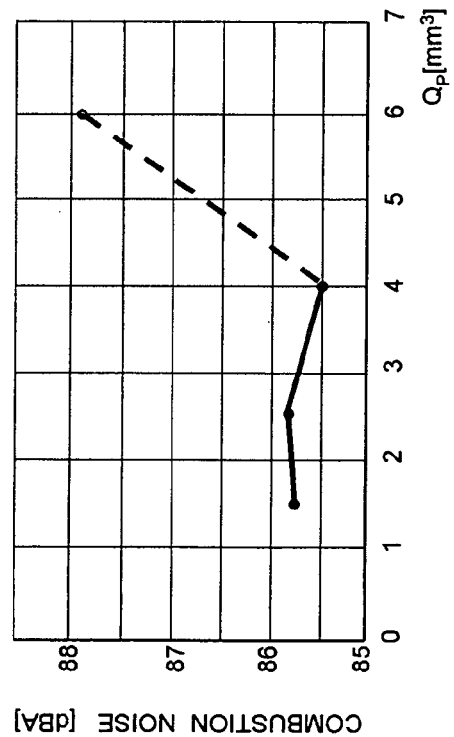

The execution of the control according to b) (second control modality) entails (FIG. 6b), instead, the angular displacement of the centroid of combustion in the same direction indicated by the arrow F1 in FIG. 4b, without modifying appreciably the maximum value of the heat-release peak (FIG. 6a) and hence without affecting the combustion noise (FIG. 6c). FIG. 5 (which are similar to FIG. 3) illustrate moreover the trend of heat release as a function of the modification in the amount of fuel Qp injected with the pilot injection P.

In the case b), the regulation of the amount of fuel Qp injected with the pilot injection P is suited for a control of the centroid of combustion, whilst is far from effective or altogether ineffective in the control of the combustion noise (see once again FIG. 6c).

The two control strategies can be used individually or else simultaneously, thus summing the contributions that can be obtained from the individual strategies.

For example, for the purpose of regulating the position of the centroid of combustion there can be implemented:

a) displacement in time of the entire injection train with respect to a reference (TDC), i.e., the displacement in time of the pilot injection P and the main injection M, to obtain a rough positioning of the centroid;

b) regulation of the distance Tp-m between the pilot injection P and the main injection M to obtain a precise positioning of the centroid; and c) regulation of the amount of fuel Qp injected with the pilot injection P.

Furthermore, for the purpose of reducing the combustion noise, it is possible to envisage the following operations: increasing the distance Tp-m (FIG. 4c) and, if it is desired to maintain the position of the centroid of combustion unvaried, simultaneously reducing by a pre-set amount the quantity of fuel Qp injected with the pilot injection P (FIG. 6c), increasing by the same amount the fuel injected with the main injection M; or else displacing the injection train.

It is emphasized how, both of the strategies a) and b) enable displacement of the centroid of combustion. In particular, the centroid of combustion is displaced towards smaller time values as Tp-m increases or as the fuel injected with the pilot injection P increases. This fact concurs to increasing the overall stability of combustion and is particularly advantageous should there be set up a condition of instability in the combustion itself.

A condition of instability can for example arise should there occur a long ignition delay and/or a large amount of recirculated burnt gases be supplied to the combustion chamber 16.

A sudden increase in EGR can in fact further increase the ignition delay, so causing a misfire.

According to the control proposed by the present invention, said conditions of instability can be detected and promptly countered by activating the control that shifts the centroid of combustion.

In order for PCCI combustion to be effective, it is necessary for the total amount of fuel injected to have time to premix prior to start of combustion.

The above fact imposes the need for the ignition delays to be longer than the injection times and would appear to be in marked contrast with the use of a pilot injection P. Traditionally, in fact, the pilot injection P is used for reducing ignition delays and limiting the accumulation of fuel and the step of premixing of the main injection M.

Finally, it is pointed out how the amount of fuel Qm injected by means of the main injection M can be determined according to the engine r.p.m. RPM and the engine load BMEP.

According to the present invention, the pilot injection P is used in an innovative manner and with functions different from those of traditional use in so far as it is executed in such a way as not to vary the ignition delay and the step of premixing of the main injection. In the present invention, the pilot injection P is carried out immediately prior to the main injection and in the presence of conditions of low ignitibility in the chamber. In this way, the two injections are completely premixed prior to burning, and the pilot injection P is unable to have any effect on the main injection M, since there is an excessive dispersion of the main injection in the combustion chamber to receive the heat of the pilot injection P. As illustrated in FIG. 3, in fact, a variation in the distance of the pilot injection P does not vary the instant of start of energy release of the main injection M, and hence its premixing step, which proves that the pilot injection P has no direct effect on the combustion of the main injection M. The same behaviour is noted in the case where the amount of pilot injection P varies. The pilot injection P is used in the present invention, in the operation with PCCI combustion, with the purpose of providing a tool on which it is possible to act for modifying the form of the release of energy of combustion, and not as a tool for controlling ignition delay of the main injection M.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

The invention claimed is:

1. A closed-loop electronic control system for controlling combustion in a diesel engine operating with highly premixed combustion, in which an injection system is designed to enable at least two injections of a same type of fuel in one cylinder per engine cycle, said injections comprising at least one pilot injection, wherein the at least one pilot injection is a first injection in an engine cycle, and a subsequent main injection, said system comprising:
    sensor means designed for measuring or calculating quantities characteristic of the process of fuel combustion; and
    closed-loop control means, which carry out a control of the fuel-injection modality based upon the measured or calculated value of said quantities and upon reference values by regulating at least one of the following parameters:
        a) the distance in time between the pilot injection and the main injection; and
        b) the amount of fuel injected by means of the pilot injection;
    wherein the regulating of the at least one of the parameters of the distance in time between the pilot injection and the main injection and the amount of fuel injected by means of the pilot injection does not vary an ignition delay of the main injection.

2. The system according to claim 1, in which said sensor means are designed for calculating/measuring at least one of the following quantities:
    the instant of start of combustion;
    the centroid of the combustion process;
    the maximum derivative of the pressure cycle; and
    the noise emitted during the combustion cycle.

3. The system according to claim 2, in which the distance in time between the pilot injection and the main injection is regulated by keeping constant the position in time of the main injection and regulating in time the position of the pilot injection.

4. The system according to claim 1, in which the amount of fuel altogether injected by means of said pilot injection and said main injection is maintained sensibly constant.

5. The system according to claim 1, in which the amount of fuel injected by means of the pilot injection is regulated by carrying out a pre-set number of successive cycles of opening of an injector.

6. The system according to claim 1, in which the stability of combustion is controlled in order to detect any possible situations of instability and activate accordingly said control, which concurs to anticipate the centroid of combustion thus opposing said instability.

7. The system according to claim 1, in which said control carries out displacement of the position of the centroid of combustion by means of one or more of the following operations:
    a) displacing in time the pilot injection and the main injection to obtain a rough positioning of the centroid;
    b) regulating the distance between the pilot injection and the main injection to obtain a precise positioning of the centroid; and
    c) regulating the amount of fuel injected with the pilot injection.

8. The system according to claim 1, in which said distance in time is regulated for the purpose of affecting the combustion noise.

9. The system according to claim 1, in which said distance in time is increased for the purpose of reducing the combustion noise.

10. The system according to claim 9, in which said distance in time is increased up to a limit value, beyond which a further increase in the distance produces an increase in noise.

11. The system according to claim 10, in which when said limit value is reached, in the presence of a request for regulation of the centroid, the pilot injection and the main injection are displaced in time to obtain a positioning of the centroid that does not concur to increasing noise.

12. The system according to claim 1, in which the amount of fuel injected by means of the main injection is a function of the engine r.p.m. and the engine load.

13. The system according to claim 1, wherein the distance in time between the pilot injection and the main injection is no greater than 400 µs.

14. The system according to claim 1, wherein the pilot injection is carried out immediately prior to the main injection.

15. The system according to claim 1, wherein the amount of fuel injected by means of the pilot injection is of a relatively large quantity.

* * * * *